United States Patent [19]

Pollner et al.

[11] Patent Number: 4,917,564
[45] Date of Patent: Apr. 17, 1990

[54] HOLD-DOWN SYSTEM FOR AN AIRCRAFT TOWING VEHICLE

[75] Inventors: Juergen Pollner, Munich; Gregor Trummer, Aschering; Peter Moelzer, Schawbhausen, all of Fed. Rep. of Germany

[73] Assignee: Krauss-Maffei AG, Munich, Fed. Rep. of Germany

[21] Appl. No.: 250,272

[22] Filed: Sep. 28, 1988

[30] Foreign Application Priority Data

Sep. 28, 1987 [DE] Fed. Rep. of Germany ....... 3732645

[51] Int. Cl.⁴ .......................... B64F 1/22; B62D 49/02
[52] U.S. Cl. ...................................... 414/428; 414/430
[58] Field of Search ................................ 414/426–430, 414/458, 459, 917

[56] References Cited

U.S. PATENT DOCUMENTS

| | | | |
|---|---|---|---|
| 3,049,253 | 8/1962 | Cabral | 414/428 |
| 3,586,187 | 6/1971 | Wright | 414/428 |
| 4,225,279 | 9/1980 | Boyer | 414/428 |
| 4,375,244 | 3/1983 | Morin | 414/429 X |
| 4,632,625 | 12/1986 | Schuller et al. | 414/429 |
| 4,655,670 | 4/1987 | Högberg et al. | 414/426 X |
| 4,810,157 | 3/1989 | Schopf | 414/429 |

FOREIGN PATENT DOCUMENTS

| | | |
|---|---|---|
| 2812434 | 10/1978 | Fed. Rep. of Germany . |
| 3521429 | 12/1986 | Fed. Rep. of Germany . |
| 3534045 | 4/1987 | Fed. Rep. of Germany . |
| 1334800 | 10/1973 | United Kingdom . |
| 85/00790 | 2/1985 | World Int. Prop. O. . |

Primary Examiner—David A. Bucci
Attorney, Agent, or Firm—Townsend and Townsend

[57] ABSTRACT

An aircraft towing vehicle has a frame with a rearwardly opening, U-shaped recess for receiving the nose wheel of an aircraft. A lifting and securing mechanism is disposed within the recess and includes a ramp and a stop plate carried by the frame, a lifter which pushes the nose wheel from behind up the ramp into abutment with the stop plate, and a pivotable hold-down mechanism mounted above the ramp. In its rest position the hold-down mechanism is set at a distance from the ground which is less than the diameter of the smallest nose wheel of the types of aircraft that can be towed. It contacts the periphery of the nose wheel being engaged at an upper forward quadrant of the wheel's periphery and passively moves in tandem with the nose wheel as it is being pushed up the ramp into its secured position. At the end of the engaging operation, the hold-down mechanism applied a downwardly directed force of a predetermined magnitude against the nose wheel, which is generated by a hydraulic actuator. The pressure remains sealed in the hydraulic actuator so that the clamping force is applied to the nose wheel throughout the towing operation. A sensor is provided for detecting any pressure drop in the hydraulic actuator and triggering a corresponding alarm signal.

13 Claims, 8 Drawing Sheets

HOLD-DOWN SYSTEM FOR AN AIRCRAFT TOWING VEHICLE

BACKGROUND OF THE INVENTION

A previously tested prototype of a towing vehicle of the general type under consideration herein, which was reported on in the media has a hold-down mechanism or holder for the nose wheel defined by horizontal arms. Before the nose wheel is engaged these arms are positioned at a height which corresponds to the nose wheel diameter for the aircraft type to be towed and while in this position act as fixed contact surfaces for the top of the nose wheel. This prepositioning of the horizontal arms is controlled by a computer which stores the necessary positioning data for the nose wheel diameters of various aircraft types that are to be towed with the vehicle. The operator must punch aircraft type identifying information into the computer to enable the prepositioning of the horizontal arms. Actual field tests of this prototype have revealed that it has some deficiencies.

First the prepositioning of the horizontal arms hinges on whether the correct aircraft identifying information has been punched into the computer and is, therefore, subject to human error. If the hold-down arms are set at the wrong height they can collide with and cause substantial damage to either the nose wheel, or worse still, to components of the nose wheel undercarriage mounted immediately above the nose wheel, e.g. the steering cylinder, the nose wheel doors and the like. The danger of damage is especially high for certain types of aircraft on which these components are located only a short distance above the nose wheel, when the nose wheel suspension is fully compressed, or when the air cylinder of the nose wheel suspension is empty. Nevertheless, damage to the nose wheel undercarriage must be avoided at all cost.

It has also been observed that the prepositioned hold-down arms do not effect a sufficiently secure connection of the nose wheel to the towing vehicle. When the aircraft is being towed and especially during acceleration, the nose wheel can dynamically move relative to the arms, which is often magnified as a result of the tire's inherent resiliency. These relative wheel movements generate forces which can overstress the nose wheel undercarriage or work the nose wheel free from the nose wheel securing or clamping device, especially if the initial holding force was relatively small. The latter can occur because the nose wheel engaging members are not capable of following the nose wheel periphery into engagement by, in effect, resiliently applying a holding force to the wheel so that, for example, minor variations in the wheel diameter, say due to wear, do not affect the force with which the wheel is held.

More conventional aircraft towing vehicles, which utilize a tow bar attached to the nose wheel undercarriage, typically have a shear pin which breaks to separate the towing vehicle from the aircraft before the nose wheel undercarriage can be overstressed by excessive forces which might be generated during towing. Such towing vehicles have a relatively poor connection to the aircraft and they can jackknife, especially during braking. Hence such towing vehicles are suitable only for low speed towing of unloaded aircraft manned by the pilot or flight engineer. Because these towing vehicles operate at low speeds, an occasional disengagement from the aircraft is acceptable since the aircraft can be slowed and brought to a stop independently of the towing vehicle.

Towing vehicles of the kind, however, which raise the nose wheel off the ground and clamp it in position permit relatively high speed towing of even unmanned aircraft and make it feasible to efficiently tow fully loaded aircraft to and from the runway. For such towing vehicles, it is essential that the nose wheel remains firmly secured under all circumstances and that it not be allowed to work itself free, or to "climb out" of the clamping mechanism.

A further drawback of the earlier version of wheel clamping towing vehicles has been their reliance on electronic signals and data processing to control and guide the components of the lifting and securing mechanism, e.g. setting the height of hold-down arms by means of stored data for different aircraft types, which is preselected by the vehicle operator, and their reliance on sensors that monitor and signal the relative positions of the components. The surroundings of large commercial airports employing aircraft towing vehicles of this type are full of significant electronic background noise and/or interfering signals which may disrupt the proper functioning of the computer, sensors and other electronics needed on board such towing vehicles. This can lead to a malfunction of the lifting and securing mechanism such as the wrong prepositioning of the horizontal arms.

A yet further consideration for towing vehicles of this type is that the lifting mechanism must be capable of securing nose wheels having widely varying diameters. For practical purposes, the range of applicable nose wheel diameters encompasses the full range found on conventional aircraft used by the larger commercial and charter airline companies, e.g. from 31" (ca. 78 cm) at the low end (for a Boeing 757) to 49" (ca. 125 cm) at the high end of the range (for a Boeing 747). Other common commercial aircraft such as the Boeing B767, the Airbus A300, A310 and the Douglas DC 8 and DC 10 to name a few, have nose wheel diameters falling within this range.

A wheel gripping towing vehicle of this general type disclosed in German patent publication DE-OS 35 34 045 has a lifting and securing mechanism with a hold-down apparatus pivotably mounted on levers located above the lifter. The hold-down arms engage the nose wheel as it is engaged by the lifter and the former moves in tandem with the wheel. When the engaging or receiving operation is completed, the hold-down arms are hydraulically locked in their upper position in which they are located above i.e., higher than the apex of the nose wheel, particularly when used with nose wheels of a smaller diameter. Thus, hold-down arms are in danger of colliding with aircraft undercarriage components located immediately above the nose wheel. Further, the initial contact between the hold-down arms and the nose wheel occurs when the receiving operation is almost completed and they are then hydraulically locked in place. These hold-down arms too form a fixed abutment surface for the wheel in its secured position without actively generating a clamping force. Thus, the above discussed drawbacks are equally applicable to this towing vehicle.

SUMMARY OF THE INVENTION

An object of the invention, therefore, is the provision of an improved aircraft towing vehicle which firmly grips the nose wheel of an aircraft as it is received, without endangering components of the nose wheel undercarriage disposed immediately above, and without the need for the vehicle operator to preposition the nose wheel gripping system, whether with a computer as otherwise. Further, the present invention pressure-locks the nose wheel in its secured position on the towing vehicle after the wheel has been fully engaged. Pressure locking is possible because, according to the present invention, the clamping force is applied to one or more moveable members which are capable of engaging the periphery of the wheel irrespective of its precise location so that neither differences in the nominal wheel diameters, nor differences in the diameter of a given wheel size, say due to wear, affects the clamping force that is applied and, therefore, the tightness of the grip. This effectively suppresses dynamic relative movements of the wheel in the gripping system.

Accordingly, the present invention provides a hold-down mechanism, or holder, which is positioned above a nose wheel supporting ramp carried by the frame of the vehicle and which is disposed substantially opposite the lifter for the nose wheel in such a way that the holder engages the nose wheel from about the beginning of the engaging operation and at a point always situated below the apex of the wheel, regardless of its diameter. This avoids the danger of collision with and damage to the nose wheel undercarriage located immediately above the nose wheel apex. Further, the holder of the present invention moves in tandem with the nose wheel as the lifter pushes it up the ramp, all the time maintaining contact with the wheel over a limited portion of its circumference above its axis and below its apex. The holder remains passive during the engaging operation and follows the movement of the nose wheel as it rolls up the ramp. Consequently the holder need not be pre-set and it requires no automatic controls. After the nose wheel is completely engaged, the hold-down arms of the holder actively exert a clamping force of a predetermined magnitude on the wheel to firmly hold it in or secure it to the gripping device, while simultaneously minimizing or preventing dynamic wheel movements during towing.

A further advantageous feature of the present invention is the elimination of the need for electronic data processing to set and/or operate the nose wheel gripping device, relying instead on simple electric and hydraulic circuits to effect the required movement of components. This renders the hold-down mechanism immune to malfunctions which are possible as a result of background noise or electronic interference signals that can adversely affect computers and other electronic data processing equipment.

The present invention also effectively prevents the nose wheel from accidentally working itself free from the hold-down mechanism. For example, a sudden loosening of the nose wheel, e.g. as a result of a drop in the tire pressure or a failure of the vehicles' hydraulic system, is immediately detected and triggers an alarm signal. It is used to warn the operator to terminate the towing operation immediately so that corrective measures can be taken.

DESCRIPTION OF THE PREFERRED EMBODIMENTS

Figure 1:
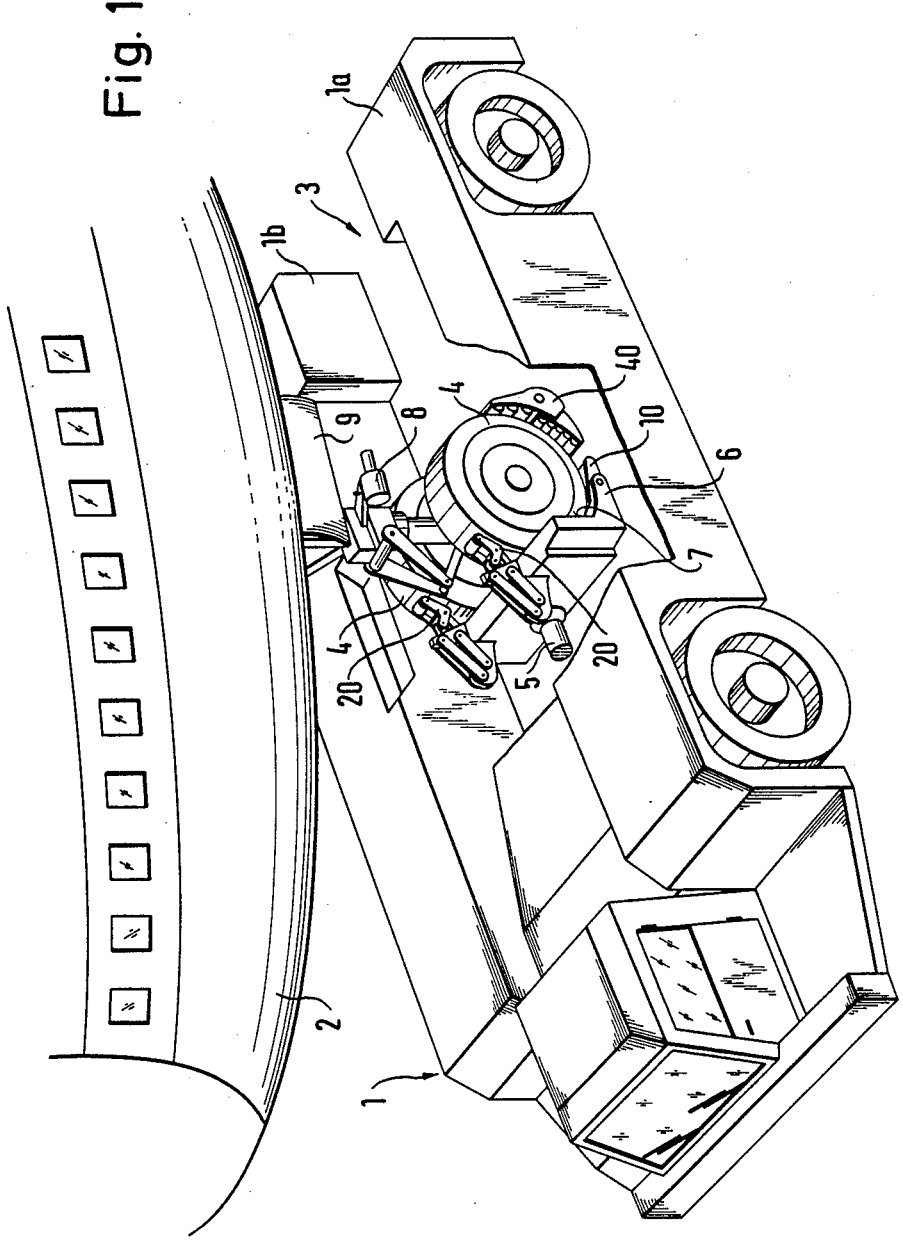
FIG. 1 is a fragmentary, perspective view of a towing vehicle constructed in accordance with the present invention and pulling an aircraft.

FIG. 1 schematically shows a towing vehicle 1 hauling an aircraft 2. Towing vehicle 1 has a bifurcated chassis defined by two side arms 1a, 1b which form between them a rearwardly opening well or recess 3. In use the towing vehicle is maneuvered rearwardly towards a waiting aircraft until the aircraft's nose wheels and the associated undercarriage are disposed within recess 3. The aircraft nose wheels 4 are now engaged by the lifting and securing mechanism of the present invention, lifted off the ground, and secured or locked to the towing vehicle. FIG. 1 shows a simplified embodiment of the lifting and securing mechanism in side perspective with side arm 1a broken partially away to provide a better view of the mechanism. The mechanism has the following main components:

An abutment 6 pivotally mounted on a longitudinally oriented shaft 5. The abutment includes a vertically oriented, rearwardly facing stop plate 7 for the nose wheels 4.

A ramp 10 for supporting nose wheels 4 which is connected to abutment 6 and which is pivotable about a horizontal axis.

Two holders 20 which are pivotally attached to abutment 6. Each holder engages a nose wheel 4, generally from the front and above. A hydraulic actuator forces each holder generally downwardly against the periphery of the associates wheel.

A lifting mechanism or lifter 40 that can be moved generally forwardly (to the left as seen in FIG. 1) into engagement with an aft portion of each wheel to push the wheel up ramp 10, and then forcing the wheel with a predetermined force against stop plate 7.

These mechanisms, of which only the main features are shown in FIG. 1, are described in greater detail below.

FIG. 1. also shows equipment that forms part of the nose wheel undercarriage and is located immediately above the nose wheels 4 such as a hydraulic steering cylinder 8 and a landing gear door 9. It is absolutely essential that the nose wheel lifting and securing mechanism be constructed so that no part of the aircraft, including the above-mentioned components, can be damaged even in the event of a malfunction or mishandling of the towing vehicle and/or its nose wheel lifting and securing mechanism.

Figure 2:
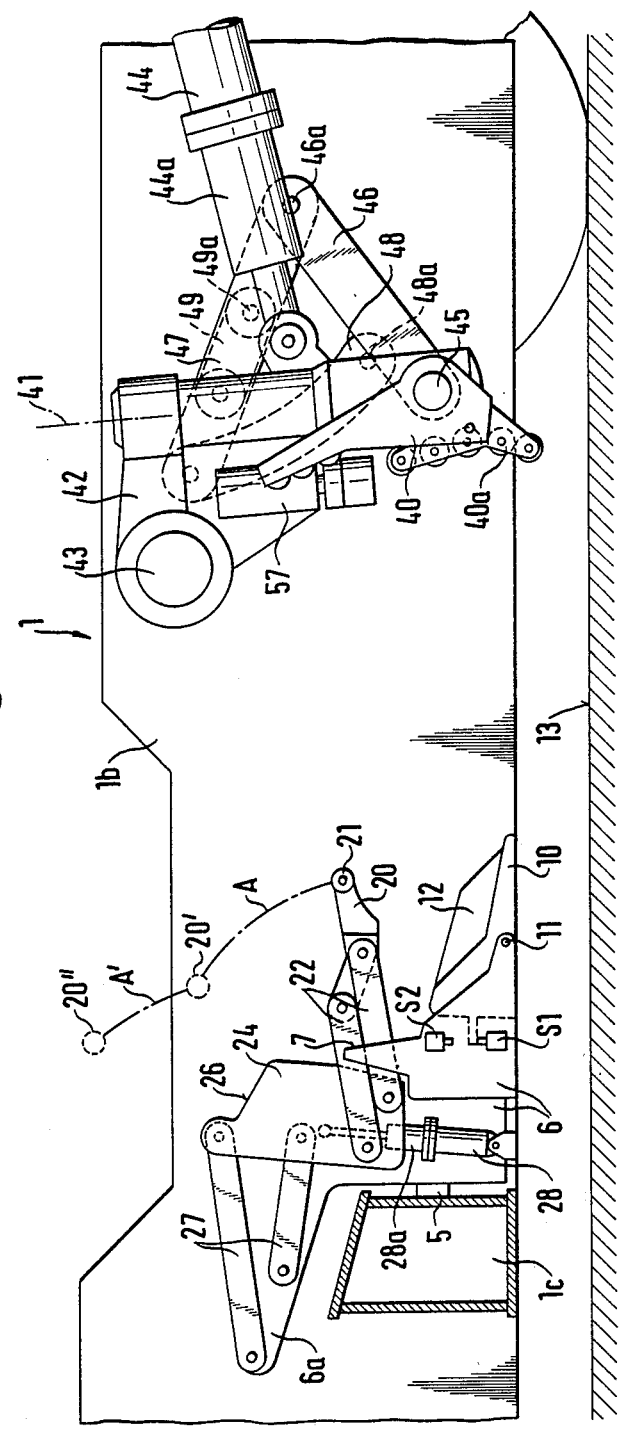
FIG. 2 is a schematic side elevational view, in section, through the nose wheel lifting and securing mechanism of the vehicle shown in FIG. 1.
Figure 3:
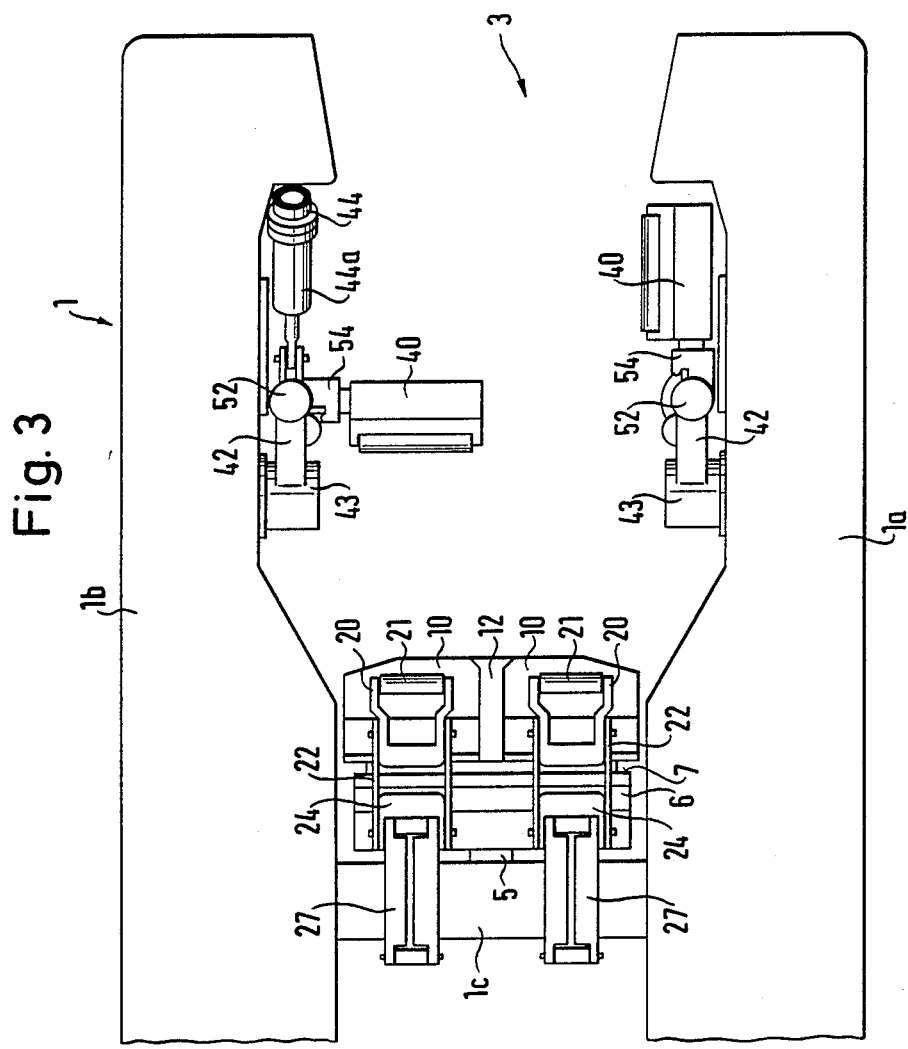
FIG. 3 is a plan view of the lifting and securing mechanism shown in FIG. 2.

FIG. 2 shows in a side elevational view the part of the lifting mechanism affixed to the right side arm 1b. FIG. 3 is a plan view of the entire lifting and securing mechanism.

Abutment 6 and its associated stop plate 7 are pivotable about a longitudinally extending, horizontal shaft 5 mounted to a cross beam 1c of the towing vehicle. Ramp 10 is pivotable about transverse, horizontal shaft 11 and it is disposed aft (to the right as seen in FIG. 2) of abutment 6. Ramp 10 has a shovel-like, upwardly concave (on the side facing the nose wheel) or angled profile. It includes a front section (immediately to the left of shaft 11 in FIG. 2) which is steeper or more vertically inclined than the rear section. The ramp may be fitted with a centering rib 12 that extends in between the nose wheels to assist in aligning the nose wheel undercarriage with the center of the towing vehicle aircraft.

FIG. 2 shows ramp 10 in its rest position in which the ramp's lower (aft) surface is substantially parallel to runway 13, and does not extend below the chassis of the towing vehicle so as to not reduce its ground clearance. To engage the nose wheels ramp 10 is tilted in a clockwise direction out of its rest position shown in FIG. 2 into a wheel receiving position in which its aft edge is proximate to, e.g., spaced only a short distance above runway surface 13. As the nose wheels ride up on ramp 10 it is tilted in a counterclockwise direction, past its rest position shown in FIG. 2 to a holding position in which the ramp fully supports the nose wheel undercarriage.

Each holder 20 includes at its free end a roller 21 supported by a pair of parallel links 22 pivotally mounted to a carrier 24. The carrier 24 in turn is supported by two guide arms 27 which are pivotally attached to a forwardly projecting bracket 6a of abutment 6. A hydraulic hold-down actuator 28 is pivotably attached to the vehicle chassis and, upon activation, exerts a downward force onto carrier 24. The upper portion of carrier 24 forms a stop surface 26 which limits the movement path of holder 20 supported by links 22. The entire mechanism is constructed so that it moves, when a nose wheel riding up on ramp 10 from its rearward most position, as shown in FIG. 2, applies a force against the holder, along an initial arc A to position 20' as guided by links 22. At this point, holder 20 abuts contact surface 26 of carrier 24. In the next, second phase of the wheel engaging operation the holder 20, together with carrier 24 move along a second arc A' into their uppermost position 20" under the guidance of arms 27.

The above described components of this mechanism are dimensioned and arranged so that nose wheels of the relatively larger aircraft types can be engaged. Of the larger commercial aircraft in use today, the Boeing 757 exhibits the smallest nose wheel diameter, i.e. 31 inches (79 cm) while the Boeing 747 has the largest nose wheel diameter of about 49 inches (124 cm), with other conventional commercial aircraft, e.g. the Boeing 767 DC 8, DC 10, the Airbus A-300 and A310 having nose wheel diameters between these extremes. At its lowest position, shown in FIG. 2, roller 21 of holder 20 is located 62-79 cm above the surface of runway 13, which is less than the diameter of the smallest nose wheel, but higher than half the diameter of the largest nose wheel of the above mentioned aircraft types. Further, holder 20 is located above the aft edge of ramp 10 and to the rear of ramp pivot shaft 11.

When so arranged, holder 20 contacts the forward upper quadrant of the nose wheel's periphery, irrespective of the wheel diameter, when the wheels are first engaged by the ramp. It is then forced upwardly by the wheels as they travel up ramp 10. At no point prior to or during the engaging phase does the holder extend above the uppermost extent of the nose wheel periphery where it might cause damage to the steering cylinder, the nose wheel door or other components of the nose wheel under carriage.

Directly opposite the holder 20, ramp 10 and stop plate 7 is a lifting mechanism or lifter 40. The lifter is defined by two sets of rollers a movable lower segment and a fixed upper segment which are described in further detail below. Each lifter 40 is mounted to a rocker arm 42 and can be pivoted about a substantially vertical axis 41. The rocker arm 42 in turn is journaled in a horizontally oriented bearing 43 mounted to a corresponding side arm, e.g. arm 1b of the vehicle chassis. A hydraulic actuator 44 is provided for moving lifter 40 from its rearwardmost position, shown in FIG. 2, forwardly toward ramp 10 and stop plate 7 to thereby push an aircraft nose wheel up the ramp 10. Each lifter 40 on the associated rocker arm 42 can also be tilted about a generally upright axis 45.

While hydraulic actuator 44 pushes rocker arm 42 and lifter 40 forward, the tilt angle of the lifter is controlled by a linkage formed by a control arm 46, a link 47 and two guides 48,49. The upper ends of the guides are connected to link 47 while their lower ends are attached to bearings 48a, 49a mounted to side arm 1b of the vehicle chassis. Link 47 and guides 48,49, which define a four-point control linkage, guide pivot 46a of control arm 46 as lifter 40 is pushed forwardly along an arcuate, initially descending but then ascending path B. Especially at its forward portion this path is steeper than a circular path.

A hydraulic motor 57 is mounted to rocker arm 42 for pivoting lifter 40 about axis 41 into its non-operating or retracted position in which the lifter is proximate, i.e.. effectively parallel to the wall of chassis side arm 1b. This is best seen in FIG. 3 where the left hand lifter 40 (in the direction of forward movement of the vehicle, i.e., to the left as shown in FIG. 3) mounted to the left side arm 1a is shown in its retracted position. When approaching the nose wheel undercarriage, it is of course necessary that both lifting mechanisms are in their retracted positions so that the nose wheel undercarriage can pass uninhibited into chassis recess 3. Only thereafter are the lifters pivoted into their operative positions to engage each nose wheel from behind.

Figure 4:
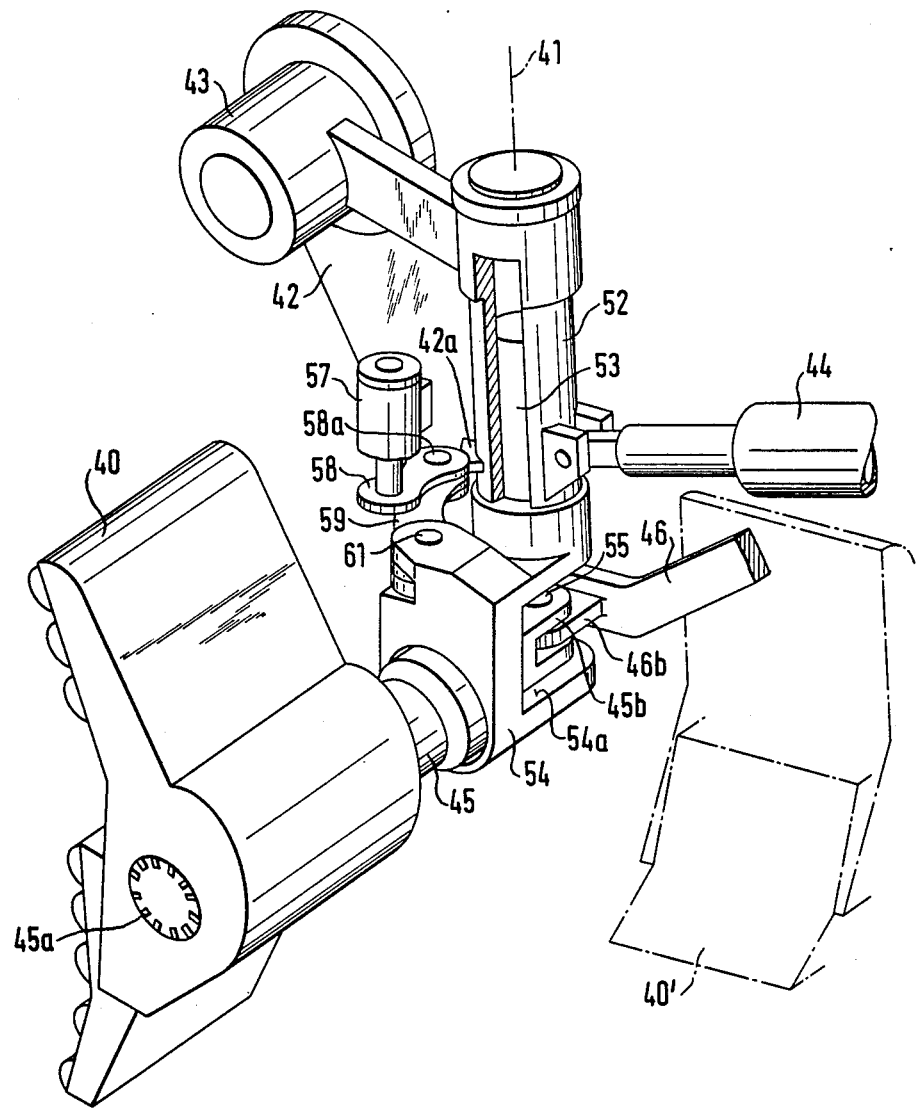
FIG. 4 is a fragmentary, elevational perspective view of the lifting mechanism shown in FIG. 2 and illustrates associated mounting supports and power drives.

The mounting of and power drives for lifter 40 are illustrated in greater detail in FIG. 4. Rocker arm 42 is pivotable about a horizontal axis defined by a bearing 43 which is secured to the vehicle chassis. The rocker arm includes a sleeve bearing 52 which journals a vertical shaft 53 of a support 54 for the lifter so that the shaft can pivot about the vertical axis 41. The support rotatably mounts a further horizontal shaft 45 to which lifter 40 is immovably keyed with radial teeth 45a. Support 54 includes a cutout 54a, on the side of the bearing for shaft 45 opposite lifter 40, into which a bifurcated end 45b of shaft 45 extends. This bifurcated end of the shaft is pivotally coupled to a lug 46b of control arm 46 with a pivot pin 55 that is coaxial with the vertical axis 41 of sleeve bearing 52. Thus control arm 46 rotates with shaft 45 about the horizontal axis of the latter so that it can be employed for controlling pivotal movements of shaft 45 with respect to support 54 for lifter 40 when hydraulic actuator 44 pivots rocker arm 42, together with lifter 40 about the axis of bearing 43. Further, the pivotable connection between control arm 46 and shaft 45 enables support 54 and lifter 40 carried thereby to pivot about axis 41 of sleeve bearing 52 so that the lifter can be pivotally moved into its retracted position 40', illustrated by broken lines in FIG. 4.

This pivotal motion is generated by a hydraulic motor 57, mounted to rocker arm 42, which drives a crank arm 58 having a free end pivotally connected with a pin 58a to a push bar 59. The push bar in turn is pivotably attached to support 54 with another pin 61. When lifter 40 is in its operating position as shown in FIG. 4. crank arm 58 abuts a detent 42a on rocker arm 42 to prevent the clockwise rotation of the carrier about axis 41 past its operating position. Push bar 59 extends from pivot 58a to pivot 61, on the right side of hydraulic motors 57 as seen in FIG, 4, when support 54 and the lifter are in their operating position. As a result a rearwardly oriented force generated when lifter 40 contacts a nose wheel during its initial engagement by and subsequent securing to ramp 10 and the lifter results in a clockwise moment in crank arm 58 that is absorbed by detent 42a. The lifter is thereby mechanically locked into its operating position.

The lifter is returned to its retracted position by activating hydraulic motor 57 to rotate crank arm 58 counterclockwise from its position shown in FIG. 4, that is away from detent 42a, until the longitudinal axis of push bar 59 has moved past, i.e. has crossed the axis of hydraulic motor 57. In the illustrated embodiment crank arm 58 must pivot through more than 180 degrees to pivot support 54 through 90 degrees and thereby return lifter 40 to its retracted position. In this position pivot 58a at the free end of the crank arm has substantially moved to where pivot 61 on support 54 is shown in FIG. 4.

Vertical axis 41 has a slight forward inclination so that lifter 40 rises somewhat as it pivots into its retracted position. This prevents the lower edge of lifter 40 from reducing the vehicle's ground clearance. In its operating position, however, the lifter may without adverse effects extend below the underside of the vehicle chassis prior to and during the engagement of the nose wheel.

Figure 5:
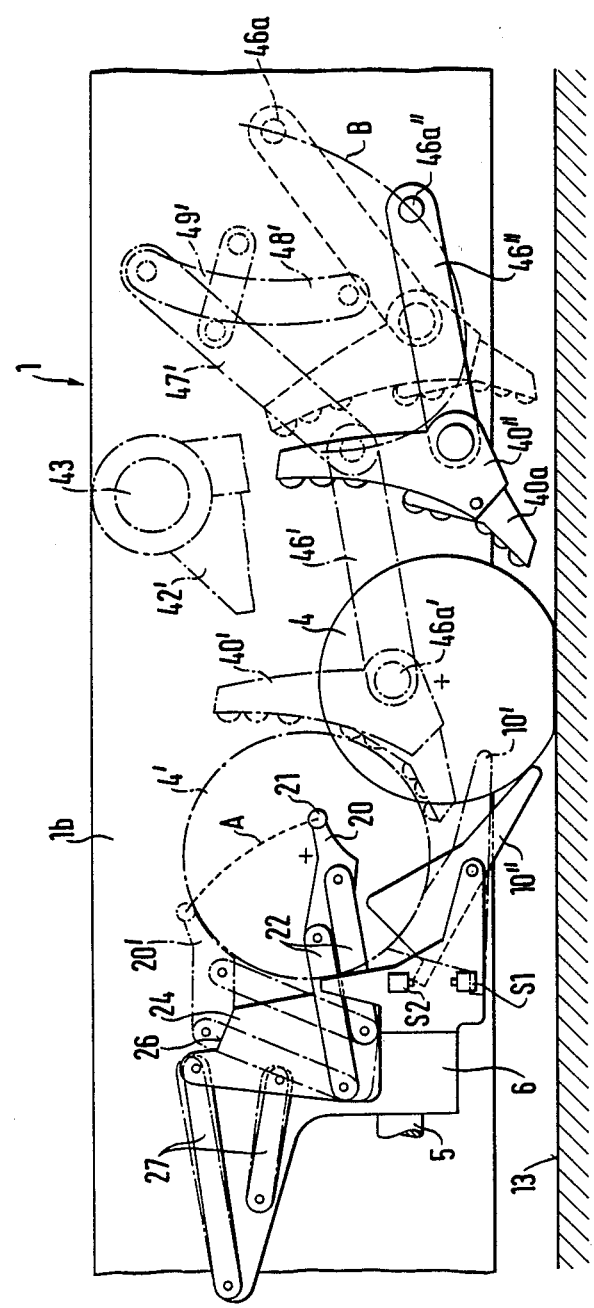
FIG. 5 is a multi-phase illustration of the lifting and securing mechanism as it engages and secures an aircraft nose wheel having a relatively small diameter.

FIG. 5 schematically shows various operating positions of the lifter and the holding mechanism as a nose wheel is being engaged and secured. The drawing illustrates a nose wheel having a diameter at the low end of the range of nose wheel diameters of common commercial aircraft for which the towing vehicle is intended. The range of diameters, as mentioned above, is from about 30 inches (75 cm) to about 50 inches (125 cm) and ranges from the Boeing 757 (nose wheel diameter 31") at the lower end of the spectrum to the Boeing 747 (nose wheel diameter 49") at the higher end. The lifter and holding mechanism must be constructed to receive all nose wheels falling in this size range effectively and without risk of damage. Once a wheel is received, it must further be firmly secured to prevent the possibility of an accidental release of the wheel.

In the operation lifter 40 is initially in its retracted position. The towing vehicle is maneuvered backwards towards the parked aircraft until the nose wheel enters the U-shaped recess of the vehicle chassis and contacts the aft edge of ramp 10. The impact of the wheel against ramp 10 tilts the ramp downwardly into position 10", shown in solid lines in FIG. 5. Ramp 10 thereby activates a limit switch S2 which generates a signal that is used to disengage the towing vehicle's drive, at least for reverse operation to prevent the vehicle from backing into and possibly damaging nose wheel 4. In addition, the signal from switch S2 activates the power drives 57,44 for lifter 40. The operator can then engage the power drives by means of a control lever. As long as limit switch S2 has not been activated as a result of contact between nose wheel 4 and ramp 10, the power drives are inoperative to prevent the unintended activation of the lifter.

When the power drives are activated, hydraulic motor 57 first pivots each lifter 40 from its retracted into its operating position. Each hydraulic actuator 44 is then energized with hydraulic fluid to force the associated piston rod outward. In this manner, lifter 40 and angularly fixed control arm 46 are advanced from their starting position, indicated by broken lines in FIG. 5, to an intermediate position 40", 46" shown in solid lines, in which the rollers of lifter 40 abut nose wheel 4 while the lower, tiltably mounted roller segment 40a of the lifter pivotally adjusts itself to the periphery of the nose wheel actuator. As the piston rod continues to move out of hydraulic actuator 44, lifter 40 pushes nose wheel 4 onto and up ramp 10. While this takes place the nose wheel also contacts holder 20 and, as the wheel rides up ramp 10, the holder, guided by links 22, moves along arcuate path A. The point of contact between the holder and the nose wheel will consistently be in the forward upper quadrant of the nose wheel's periphery, typically between about 30-60 degrees from the wheel's apex. Before the nose wheel reaches position 4', illustrated by broken lines, holder 20 will have engaged contact surface 26 of carrier 24, hence pushing the carrier, as guided by arms 27, upward and simultaneously withdrawing the piston rod of the hydraulic hold-down actuator 28 out of the associated hydraulic cylinder.

As nose wheel 4 is travels up ramp 10 its center of gravity will traverse the axis of shaft 11. The ramp will tip forwardly and by the time nose wheel 4 abuts stop plate 7, the ramp has reached its raised position 10'. During this phase hydraulic actuator 44 has advanced lifter 40 into position 40' shown in broken lines. The free end 46a of control arm 46 coupled to lifter 40 prescribes a path which descends initially and then rises sharply along the illustrated arc B. In FIG. 5 broken lines illustrate the final positions of lifter 40', control arm 46', link 47', and guides 48', 49', which together comprise a steering or control linkage, as well as the end position of rocker arm 42', which carries lifter 40 and is mounted to bearing 43.

The guidance of control arm 46 by the control linkage causes lifter 40 to initially tilt slightly rearwardly, as it is pivots forwardly, so that its lower segment 40a reaches or extends as far as possible beneath the nose wheel. At the terminal portion of the forward pivot lifter 40 tilts sharply forward so that its rigid upper segment abuts the nose wheel periphery, or is at least in close proximity to the wheel where it functions, together with holder 20, as a barrier which secures the nose wheel in position and prevents it from further moving in an upward direction. When the nose wheel first contacts stop plate 7 and ramp 10 has tilted into its raised position, a limit switch S1 is activated. It generates a signal that is used to apply hydraulic fluid of a controlled pressure to hydraulic actuators 44 and 28 (cf.

FIG. 2; not shown in FIG. 5) to thereby apply forces of a predetermined and controlled magnitude to the lifter 40 and holder 20 which in turn are applied against the nose wheel periphery. This assures that the nose wheel is firmly secured in position irrespective of the prevailing tire pressure, the degree of wear and/or the quality of the tire surface.

Once the nose wheel is secured, a piston rod clamp 44a of hydraulic actuator 44 is engaged to thereby mechanically lock the piston rod in the set position. Hydraulic actuator 28 is locked in its set position by sealing the pressurized hydraulic fluid in its cylinder so that it continues to act on its piston. These operations are sequenced automatically once the driver of the towing vehicle has activated the power drives for the lifter.

If a malfunction is encountered after the nose wheel has been secured, e.g. during towing of the aircraft, say if the air pressure in the tire of the nose wheel suddenly drops the sealed in pressure in actuator 28 automatically lowers the holder. This, however, leads to an immediate pressure reduction in the actuator which is detected by a pressure sensor and triggers an alarm signal warning the driver to stop the towing vehicle. Further, as the holder moves towards the axis of the deflating nose wheel, a piston rod clamp 28a of hydraulic actuator 28 is released to arrest the further retraction of the piston rod after a piston movement of only a few mm. Thus, the nose wheel remains firmly secured despite the malfunction.

Figure 6:
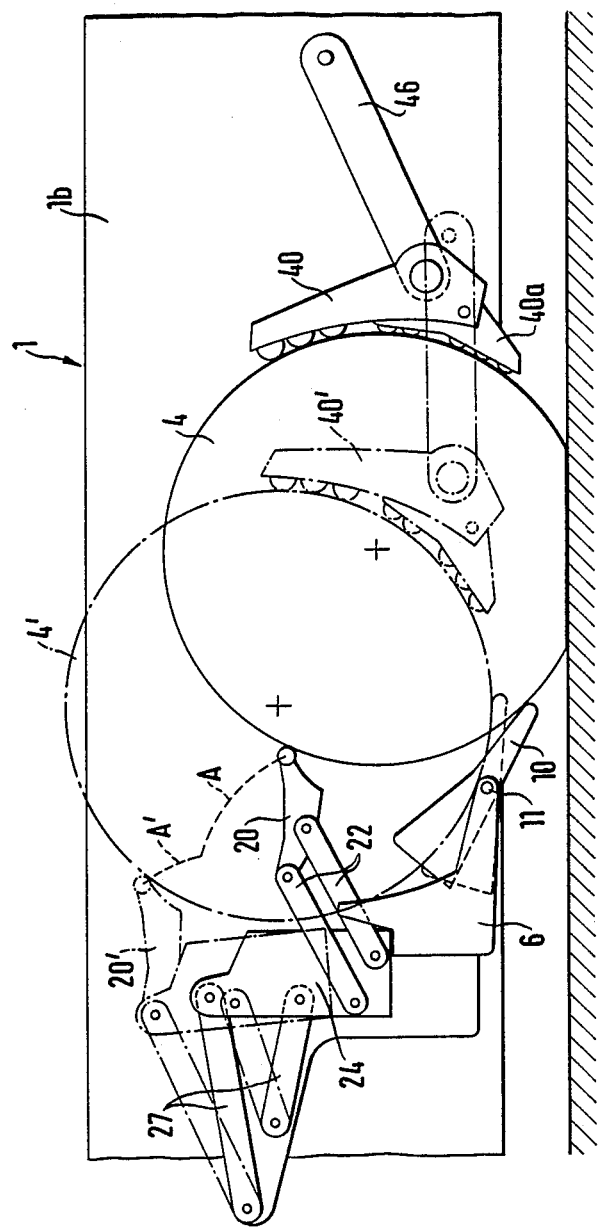
FIG. 6 is a multi-phase illustration, similar to FIG. 5, of a lifting and securing mechanism as it engages and secures an aircraft nose wheel having a relatively large diameter.

FIG. 6 shows, similar to FIG. 5, the various positions of a nose wheel that is being engaged and secured but which has a large diameter wheel with respect to the range of nose wheels cited above, e.g. the nose wheel of a B 747 aircraft having a wheel diameter of about 49". The nose wheel shown in solid lines is positioned on the tip of ramp 10 after it tilted the latter downwardly. Holder 20 touches the nose wheel periphery, while lifter 40 has made peripheral contact with the nose wheel after having been pivoted forward from its retracted position but before it has been significantly tilted rearwardly by control arm 46. As the lifter continues to advance forward, pushing the nose wheel 4 onto ramp 10, it is tilted increasingly rearwardly, i.e. in a clockwise direction as seen in FIG. 6, by control arm 46. This forces the freely pivoting lower segment 40a of the holder increasingly further beneath the nose wheel. At the same time holder 20 travels along the prescribed arc A, guided first by links 22 and then by arms 27, all the while shifting its peripheral contact point on wheel 4 only slightly to maintain a position on the wheel at an angle of between about 30-60 degrees from the wheel's apex. As a result of the larger wheel diameter, carrier 24 moves upwardly a substantially greater distance as compared to the distance it travels with wheels of smaller diameter as shown in FIG. 5. Similarly because of the larger wheel size the lifter shown in FIG. 6 at position 40' has traveled only about half the distance between lifter positions 40' and 40" shown in FIG. 5.

For the sake of clarity FIGS. 5 and 6 were drawn as if nose wheel 4 together with the entire aircraft were pulled forward. In fact, however, the aircraft remains stationary during the entire receiving and loading operation while the forward pressure exerted by lifting mechanism 40 against nose wheel 4 causes the towing vehicle to move backwards (i.e. to the right as seen in FIGS. 5 and 6), sliding ramp 10 underneath the nose wheel and thereby pushing the nose wheel upwardly. However, any attempt to illustrate the reverse motion of the tow vehicle would render the drawing unnecessarily complex and unclear. Instead the relative positions of components shown in FIGS. 5 and 6 have been drawn as if the towing vehicle remained stationary.

When the nose wheel is first engaged, lifter 40 bears substantially the entire dead weight resting on the nose wheel and in addition, it must generate the necessary force to lift the nose wheel off the ground. It is therefore essential that hydraulic actuator 44 generates a very large force which is achieved by applying a correspondingly large hydraulic pressure to the actuator. As the engaging operation proceeds, however, in increasing proportion of the nose wheel dead weight is transferred to ramp 10, especially after the latter has tilted about its pivot axis into its raised position. The force that must be generated by lifter 40 and the magnitude of hydraulic pressure in actuator 44 decreases accordingly.

Figure 7:
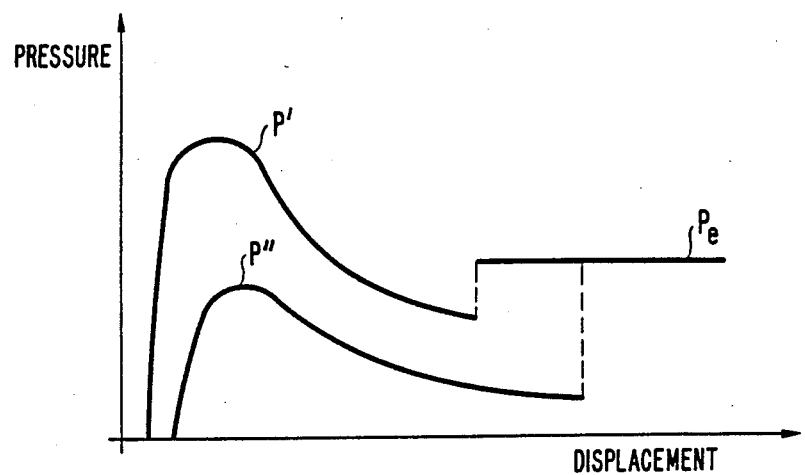
FIG. 7 is a graph illustrating as a function of elapsed time the pressure gradient within a hydraulic cylinder of the lifting mechanism as it engages a nose wheel.

FIG. 7 illustrates schematically the pressure gradient P prevailing in hydraulic actuator 44 as a function of the distance traveled by lifter 40. Upper curve P' shows the pressure gradient for an aircraft with a large nose wheel diameter, as shown in FIG. 6, supporting a correspondingly greater dead weight, Lower curve P" shows the pressure gradient for an aircraft with a relatively smaller nose wheel diameter, as shown in FIG. 5, supporting comparatively lesser dead weight. The two curves of FIG. 7 are merely approximations and it should be understood that no direct correlation necessarily exists between a given aircraft's dead weight and the nose wheel diameter.

The shape of curves P' and P" is also a function of the relative dimensions and geometry of the components of the steering linkage which controls the movement of lifter 40. These are selected so that the force generated on lifting mechanism 40 during the final stages of the engaging operation, even for wheels subjected to the largest dead weight, and therewith the magnitude of the hydraulic pressure in actuator 44, is lower than the predetermined wheel clamping force, and the clamping pressure Pe required to achieve this force that is to be exerted on the nose wheel when it is in its secured position. This is a necessary prerequisite that, in accordance with the present invention, the pressure in hydraulic actuator 44 can be increased to the clamping pressure Pe following the nose wheel engaging operation. The magnitude of the clamping pressure is independent of the nose wheel diameter and it is selected so that it is sufficient to firmly secure the nose wheel in position and minimize vibrations and relative nose wheel movements which are necessarily encountered during towing as a result of the elasticity of the tires. Conversely, the clamping pressure Pe applied to the actuator is selected so that the clamping force acting on the nose wheel cannot damage it or flatten the tire against the rim. Experiments have shown that the clamping pressure Pe should be selected so that clamping force of about 2 tons is exerted on the nose wheel.

Figure 8:
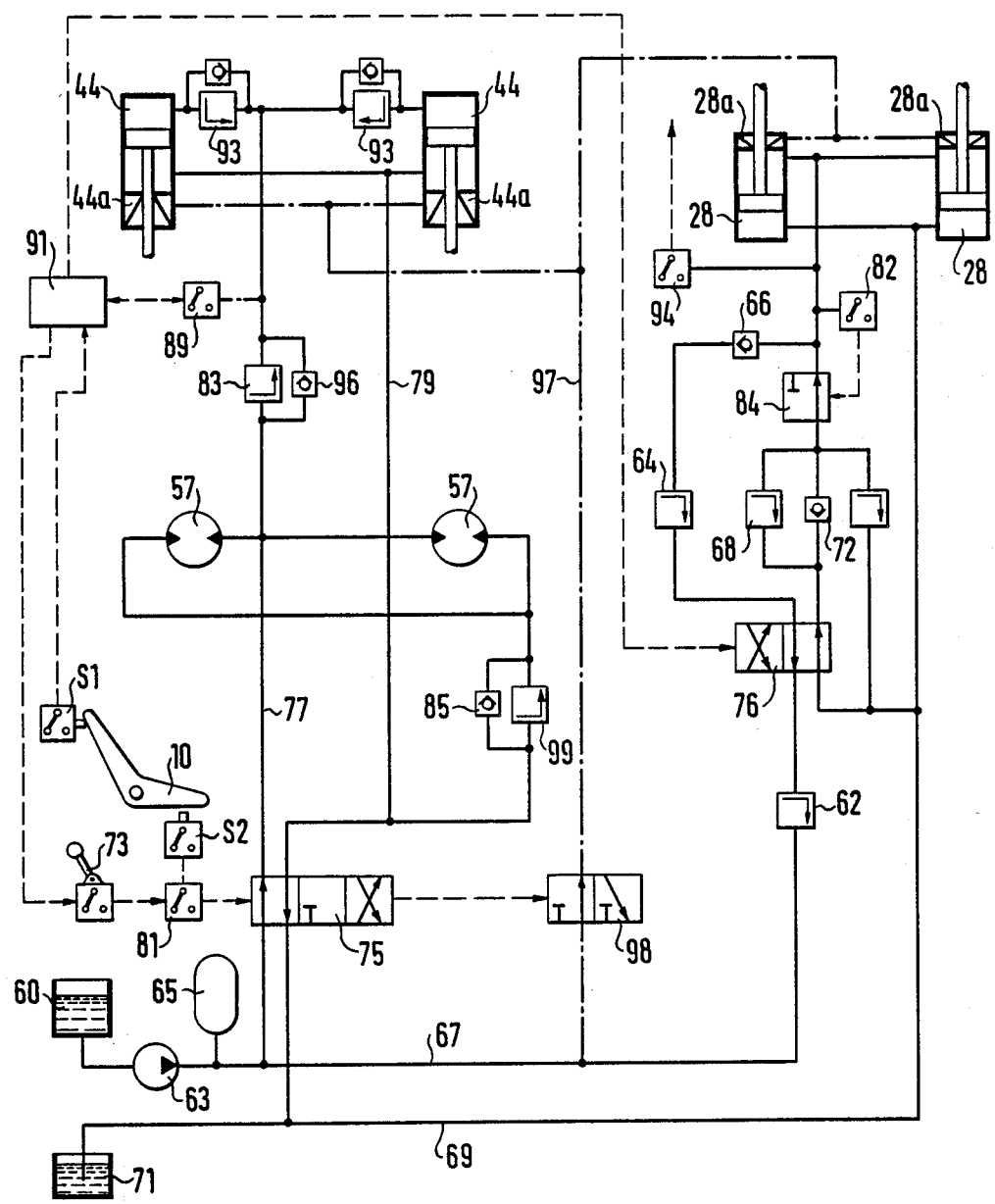
FIG. 8 is a simplified diagram of the hydraulic and electrical circuits for the lifting and securing mechanism of the present invention.

FIG. 8 is a simplified diagram of the electrical and hydraulic circuits employed by the nose wheel lifting and securing mechanisms of the present invention. Hydraulic conduits are shown in dark, solid lines hydraulic control lines are shown in dot-dash lines, and the circuitry for electric signals are shown in broken lines. Actuator 28 and 44 and motor 57 for the lifter and the holder are all hydraulically operated. Pressurized hydraulic fluid flows from a source that includes a feed reservoir 68, a pump 63 and, if needed, a pressure tank 65, into a pressure line 67.

The driver of the towing vehicle can manually operate a lever 73 to electrically open a valve 75 for directing pressurized hydraulic fluid to the hydraulic motors 57 and hydraulic actuators 44. The valve can only be engaged after the towing vehicle has properly abutted the nose wheel and tipped ramp 10 downwardly, thereby activating limit switch S2 enabling valve 75 via a relay 81. When set as indicated in FIG. 8, valve 75 permits the flow of pressurized hydraulic fluid through hydraulic line 77 to hydraulic motors 57. The motors then pivot the lifters through 90 degrees into their operating positions (cf. FIG. 4). Spent hydraulic fluid from motors 57 flows through a check valve 85 and a hydraulic line 79 into return line 69.

While the lifters are pivoted, the pressure in hydraulic motors 57 is less than the threshold pressure of a pressure release valve 83 so that the valve prevents the flow of hydraulic fluid to the hydraulic actuator 44. When the hydraulic motors 57 have stopped rotating, i.e., when the crank arm 58 shown in FIG. 4 contacts detent 42a, the pressure in line 77 increases which opens pressure valve 83. This allows pressurized hydraulic fluid to enter the cylinders of hydraulic actuators 44, forcing the piston rods outwardly and pivoting lifters 40 forward about bearings 43 until the rollers or the lifters contact the nose wheels. During this phase of the operation the hydraulic medium on the other sides of the pistons can exit from actuators 44 into hydraulic line 79.

The continuing extension of the piston rods of actuator 44 causes lifter 40 to push the nose wheel up ramp 10 towards stop plate 7 so that the ramp eventually tilts forward into its raised position. Due to the dimensional relationship of the various components the hydraulic pressure inside actuators 44 decreases during this portion of the wheel engaging operation. Before the nose wheel contacts stop plate 7, ramp 10 activates a limit switch S1. The signal generated by switch S1 is applied to a switching unit 91 which in turn activates a pressure switch 89 set for a predetermined threshold pressure Pe. Since the nose wheel 4 cannot move further once it is in contact with stop plate 7, the hydraulic pressure in actuator 44 rises sharply. This pressure rise is sensed by pressure switch 89. When signals are emitted by both switches S1 and 89, switch unit 91 closes valve 75, thereby completing the engaging and nose wheel lifting operation. A check valve 93 in fluid communication with the cylinders of hydraulic actuators 44 causes the retention of the pressure in the cylinder which prevailed when pressure switch 89 was activated, thereby setting the clamping pressure Pe.

During the nose wheel engaging operation the piston rod clamp associated with each hydraulic actuator 44 is held open, i.e., it is deactivated by the pressure in hydraulic control conduit 97. After the nose wheel is firmly secured and each actuator 44 is at the clamping pressure Pe piston rod clamps 44a are released by opening control valve 98 to depressurize control conduit 97. The piston rods of hydraulic actuators 44 are thereby clamped or locked in place and nose wheel 4 remains firmly secured, even in the event of a pressure loss in the hydraulic system.

To release and lower the nose wheel the above-described operations are essentially reversed. The driver of the towing vehicle shifts lever 73 to its nose wheel lowering position. This opens valve 98 and pressurizes hydraulic control conduit 97, thereby releasing piston rod clamps 44a. After a short delay valve 75 is operated so that pressurized fluid from conduit 67 flows into hydraulic line 79 while spent fluid from line 77 drains into line 69. Pressurized hydraulic fluid enters the cylinders of actuators 44 from line 79 and retracts the lifter, thereby lowering the nose wheel from ramp 10. Hydraulic fluid on the other side of the piston returns via a check valve 96 and lines 77 and 67.

During this phase of the operation the pressure in line 79 is lower than the threshold pressure of pressure valve 99, thus preventing the flow of pressurized fluid to hydraulic motors 57. Consequently the lifters 40 are locked into their operating positions as the nose wheel is lowered as a result of the relative dimensioning of links 58, 69 described above and shown in FIG. 4. When the actuators 44 have completed their return strokes the pressure in line 79 increases. This opens valve 99 to permit the flow of pressurized fluid to the hydraulic motors 57. The motors rotate, thereby pivoting the lifters 40 about axis 41 through 90 degrees into their retracted position.

It is clear from the above that the fully hydraulically controlled, automatic system of the present invention requires no human intervention. Thus, it is protected against the most common human errors.

During the nose wheel engaging operation described above hydraulic actuators 28 are most of the time pressureless, allowing holders 20 to move freely with the nose wheel. In a first position of control valve 76 shown in FIG. 8, pressurized hydraulic fluid from a pressure relief valve 62 flows via this control valve 76, a second relief valve 64 and a check valve 66 to the piston rod side of the cylinder of actuator 28. In this sequence the second relief valve 64 restricts the level of pressure flow to, for example, a very low 6 bars, to only slightly prestress the holder 20. Lifter 40 can readily overcome the force generated thereby. As the piston rod of actuator 28 is extended when the nose wheel rides up ramp 10, hydraulic fluid exits from the piston rod of the cylinder via a further relief valve 68, set e.g. at 8 bars and control valve 76 from where it flows into return line 69.

After the nose wheel engaging operation is completed, ramp 10 has activated limit switch S1, and the increased pressure in actuator 44 triggers pressure switch 89, switch unit 91 generates a signal that reverses the setting of control valve 76. Pressurized fluid now flows through line 67 past the first relief valve 62 and a check valve 72 into hydraulic actuator 28. The hydraulic pressure at relief valve 62 is set to equal the clamping pressure Pe, e.g. 85 bars. The holders in turn are now subjected to a clamping force of a predetermined magnitude determined by the magnitude of pressure Pe discussed above. A pressure switch 82 set for a threshold pressure which equals pressure Pe reverses a shutoff valve 84 to thereby retain the hydraulic fluid in actuator 28 at pressure Pe. This completes the securing phase.

Each actuator 28 is fitted with a well known piston rod clamp 28a which is disengaged by pressurized hydraulic fluid from control line 97 and which is activated at the completion of each nose wheel engaging operation by operating control valve 98. In its activated condition the piston rod clamps 28a oppose any further extension of the piston rods although the clamps do not oppose the further retraction of piston rods. If, when the piston rod clamps 28a are activated, the grip on nose wheel slackens, for example as a result a sudden loss of tire pressure, the holders move slightly, which results in an immediate, sharp pressure drop in the actuators 28. This pressure drop is sensed by a sensor 94 which signals a malfunction or generates an alarm signal. The signal warns the driver of the towing vehicle that the nose wheel is no longer properly secured and that it is unsafe to continue towing.

We claim:

1. An aircraft towing vehicle comprising a vehicle frame constructed to be maneuvered about a surface in forward and aft directions the frame including a generally U-shaped. rearwardly open recess formed to receive an aircraft nose wheel therein;
 a ramp carried by the frame and positioned at a forward end of the recess for receiving and supporting the nose wheel;
 means carried by the frame defining a stop surface against which the nose wheel abuts when carried on the ramp to limit relative forward movements of the nose wheel on the ramp;
 a lifter carried by the frame and operatively disposed within the recess for engaging an aft portion of the nose wheel and pushing the nose wheel onto the ramp and against the stop surface during a nose wheel engaging operation;
 a nose wheel holder including guide means operatively coupled with the frame, permitting relative movements of the holder from a lowermost position along a generally upwardly and forwardly oriented, predetermined path, and positioning the holder so that it engages a wheel being pushed up the ramp by the lifter at a point located substantially in an upper, forward quadrant of the nose wheel periphery;
 power drive means operatively coupled with the holder for applying a clamping force of a predetermined magnitude to the nose wheel; and
 sequencing means operatively coupled with the power drive means for energizing the power drive means and applying the clamping force to the nose wheel in response to the arrival of the nose wheel at a predetermined location on the ramp.

2. An aircraft towing vehicle according to claim 1 wherein the lowermost position of the holder is spaced from the surface a distance in the range of between less than the smallest and more than one-half the largest diameter of nose wheels of aircraft types adapted to be towed by the vehicle.

3. An aircraft towing vehicle according to claim 2 wherein the distance between the surface and the holder in its lowermost position is between about 60 and 80 cm.

4. An aircraft towing vehicle according to claim 1 wherein the power drive means comprises a hydraulic actuator operatively coupled with the holder.

5. An aircraft towing vehicle according to claim 4 wherein the sequencing means includes pressurizing means operatively coupled with the hydraulic actuator for, independently of the relative position of the holder, applying hydraulic fluid of a predetermined pressure to the actuator at the end of the engaging operation and for thereafter maintaining the predetermined pressure in the actuator for the duration of the aircraft towing operation.

6. An aircraft towing vehicle according to claim 1 wherein the sequencing means includes means responsive to the completion of the nose wheel engaging operation for activating the lifter and applying a force of a predetermined magnitude against the nose wheel.

7. An aircraft towing vehicle comprising a vehicle frame constructed to be maneuvered about a surface in forward and aft directions, the frame including a generally U-shaped, rearwardly open recess formed to receive an aircraft nose wheel therein;
 an elongated ramp carried by the frame and positioned at a forward end of the recess for receiving and supporting the nose wheel;
 a horizontal shaft mounting the ramp for pivotal movement between a lower position, in which the ramp can be contacted by the nose wheel while the nose wheel is on the surface, and a raised position, in which the ramp supports the nose wheel at a level above the surface;
 means carried by the frame defining a stop surface against which the nose wheel abuts when carried on the ramp to limit relative forward movements of the nose wheel on the ramp;
 a lifter carried by the frame and operatively disposed within the recess for engaging an aft portion of the nose wheel and pushing the nose wheel onto the ramp and against the stop surface during a nose wheel engaging operation;
 a nose wheel holder including guide means operatively coupled with the frame, permitting relative movements of the holder from a lowermost position along a generally upwardly and forwardly oriented, predetermined path, and positioning the holder so that it engages a wheel being pushed up the ramp by the lifter at a point located substantially in an upper, forward quadrant of the nose wheel periphery;
 power drive means operatively coupled with the holder for applying a clamping force of a predetermined magnitude to the nose wheel;
 sequencing means operatively coupled with the power drive means for energizing the power drive means and applying the clamping force to the nose wheel in response to the arrival of the nose wheel at a predetermined location on the ramp;
 a limit switch emitting a signal when the ramp arrives at its raised position at the end of the engaging operation; and
 means for applying the signal generated by the limit switch to the sequencing means for energizing the power drive means.

8. An aircraft towing vehicle according to claim 7 including a second limit switch activated by the ramp when it is pivoted into its lower position; power drive means operatively coupled with the lifter for pushing the nose wheel with the lifter onto the ramp and against the stop surface;
 means for activating the lifter power drive means; and
 means for applying the signal generated by the second limit switch to the activating means for the lifter whereby the lifter is energized and commences to push the wheel onto the ramp substantially when the ramp arrives at its lower position.

9. An aircraft towing vehicle comprising a vehicle frame constructed to be maneuvered about a surface in forward and aft directions, the frame including a generally U-shaped, rearwardly open recess formed to receive an aircraft nose wheel therein;
 a ramp carried by the frame and positioned at a forward end of the recess for receiving and supporting the nose wheel;
 means carried by the frame defining a stop surface against which the nose wheel abuts when carried on the ramp to limit relative forward movements of the nose wheel on the ramp;

a lifter carried by the frame and operatively disposed within the recess for engaging an aft portion of the nose wheel and pushing the nose wheel onto the ramp and against the stop surface during a nose wheel engaging operation;

a nose wheel holder including guide means operatively coupled with the frame, permitting relative movements of the holder from a lowermost position along a generally upwardly and forwardly oriented, predetermined path, and positioning the holder so that it engages a wheel being pushed up the ramp by the lifter at a point located substantially in an upper, forward quadrant of the nose wheel periphery;

a carrier for the holder having a stop, a link movably coupling the holder to the carrier, and a guide arm movably mounted to the vehicle frame and to the carrier, the carrier, the link and the guide arm being constructed so that during a wheel engaging operation, when the lifter pushes the wheel up the ramp, the first guide link prescribes an initial portion of the predetermined path through which the holder travels when initially engaged by a nose wheel moving up the ramp, the stop being positioned and cooperating with the holder and the link for preventing further relative movements between the holder and the carrier at the end of the initial portion of the predetermined path, the guide arm and the carrier being further formed and arranged so that thereafter the holder and the carrier move together relative to the frame through a remainder of the predetermined path;

power drive means operatively coupled with the holder for applying a clamping force of a predetermined magnitude to the nose wheel; and sequencing means operatively coupled with the power drive means for energizing the power drive means and applying the clamping force to the nose wheel in response to the arrival of the nose wheel at a predetermined location on the ramp.

10. An aircraft towing vehicle according to claim 9 wherein the power drive means comprises a hydraulic actuator operatively coupled to the carrier.

11. An aircraft towing vehicle comprising a vehicle frame constructed to be maneuvered about a surface in formward and aft directions, the frame including a generally U-shaped, rearwardly open recess formed to receive an aircraft nose wheel therein;

a ramp carried by the frame and positioned at a forward end of the recess for receiving and supporting the nose wheel;

means carried by the frame defining a stop surface against which the nose wheel abuts when carried on the ramp to limit relative forward movements of the nose wheel on the ramp;

a lifter carried by the frame and operatively disposed within the recess for engaging an aft portion of the nose wheel and pushing the nose wheel onto the ramp and against the stop surface during a nose wheel engaging operation;

a nose wheel holder including guide means operatively coupled with the frame, permitting relative movements of the holder from a lowermost position along a generally upwardly and forwardly oriented, predetermined path, and positioning the holder so that it engages a wheel being pushed up the ramp by the lifter at a point located substantially in an upper, forward quadrant of the nose wheel periphery;

a hydraulic actuator operatively coupled with the holder for applying a clamping force of a predetermined magnitude to the nose wheel, the actuator including a piston and an associated piston rod;

sequencing means operatively coupled with the actuator for energizing the actuator and applying the clamping force to the nose wheel in response to the arrival of the nose wheel at a predetermined location on the ramp;

the sequencing means including pressurizing means operatively coupled with the hydraulic actuator for, independently of the relative position of the holder, applying hydraulic fluid of a predetermined pressure to the actuator at the end of the engaging operation and for thereafter maintaining the predetermined pressure in the actuator for the duration of the aircraft towing operation;

clamp means operatively coupled with the piston rod for optionally permitting and preventing relative piston rod movements; and means activated by the hydraulic fluid of the predetermined pressure for setting the clamp means to permit relative piston rod movements and for thereafter setting the clamp means to prevent relative movements of the piston rod in response to and after the piston rod has moved a relatively small distance of a predetermined length.

12. An aircraft towing vehicle according to claim 11 including sensor means operatively coupled with the hydraulic actuator for generating an alarm signal in response to a reduction of the predetermined pressure in the actuator prior to the termination of the towing operation.

13. In an aircraft towing vehicle having a vehicle frame constructed to be maneuvered about a surface in forward and aft directions, the frame including a generally U-shaped, rearwardly open recess formed to receive an aircraft nose wheel therein;

a ramp carried by the frame and positioned at a forward end of the recess for receiving and supporting the nose wheel;

means carried by the frame defining a stop surface against which the nose wheel abuts when carried on the ramp to limit relative forward movement of the nose wheel on the ramp, thereby defining a fully loaded position for the nose wheel;

a lifter carried by the frame and operatively disposed within the recess for engaging an aft portion of the nose wheel and pushing the nose wheel onto the ramp and against the stop surface during a nose wheel loading operation;

a nose wheel holder including guide means operatively coupled with the frame and permitting relative movement of the holder from a rearmost position along a forwardly oriented, predetermined path, said rearmost position of the holder being selected so that it engages a wheel being pushed onto the ramp by the lifter at a point located substantially in an upper, forward quadrant of the nose wheel periphery; and power drive means operatively coupled with the holder for applying a force to the nose wheel;

the improvement to the guide means comprising a predetermined path for the nose wheel holder which is forwardly and upwardly oriented so that the holder can follow the movement of the nose wheel onto the ramp and maintain a point of contact with the nose wheel in a limited portion of said upper quadrant of the nose wheel periphery, the improvement further comprising sequencing means operatively coupled with the power drive means for activating the power drive means in response to the arrival of the nose wheel a said fully loaded position to thereby press the holder with a predetermined force against the nose wheel upon completion of the nose wheel loading operation and during the towing operation.

* * * * *